(12) United States Patent
Radizi

(10) Patent No.: US 12,019,677 B2
(45) Date of Patent: Jun. 25, 2024

(54) STORING AND RETRIEVING MEDIA RECORDINGS IN AN OBJECT STORE

(71) Applicant: Axis AB, Lund (SE)

(72) Inventor: Patrick Radizi, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/074,064

(22) Filed: Dec. 2, 2022

(65) Prior Publication Data

US 2023/0177081 A1    Jun. 8, 2023

(30) Foreign Application Priority Data

Dec. 8, 2021 (EP) ..................................... 21213211

(51) Int. Cl.
*G06F 16/71* (2019.01)
*G06F 16/783* (2019.01)

(52) U.S. Cl.
CPC ............ *G06F 16/71* (2019.01); *G06F 16/783* (2019.01)

(58) Field of Classification Search
CPC ................................ G06F 16/71; G06F 16/783
See application file for complete search history.

(56) References Cited

U.S. PATENT DOCUMENTS

| | | | | |
|---|---|---|---|---|
| 8,374,710 | B2 * | 2/2013 | Sutardja | ................. G11B 27/11 700/94 |
| 10,210,191 | B2 | 2/2019 | Baldwin et al. | |
| 10,474,631 | B2 | 11/2019 | Beaverson et al. | |
| 10,599,613 | B2 | 3/2020 | Feng et al. | |
| 2005/0147247 | A1 * | 7/2005 | Westberg | ............. H04N 21/426 380/200 |
| 2020/0110748 | A1 | 4/2020 | Watzke et al. | |
| 2021/0064259 | A1 | 3/2021 | Sadlon et al. | |
| 2021/0112154 | A1 | 4/2021 | Rodriguez et al. | |
| 2021/0289247 | A1 | 9/2021 | Sharp | |

FOREIGN PATENT DOCUMENTS

JP    2004-192071 A    7/2004

OTHER PUBLICATIONS

Extended European Search Report dated May 13, 2022 for European Patent Application No. 21213211.2.

* cited by examiner

*Primary Examiner* — Baoquoc N To
(74) *Attorney, Agent, or Firm* — Volpe Koenig

(57) ABSTRACT

Storing and retrieving media recordings in an object comprises a first method of storing a media recording comprising the following steps performed at an ingest component of a system: assigning a recording ID to the media recording; storing media data in one or more data objects in an object store, each carrying the recording ID; storing media metadata in an attribute object carrying the recording ID; computing a hash of the metadata; and storing the hash, the recording ID, a recording interval and a recording source in an index object. The first method further comprises concatenating the index object with an existing index object using a maintenance component. A second method is suitable for retrieving a media recording stored in an object store using the first method. A third method is suitable for performing maintenance on the object store by concatenating specific groups of index objects.

14 Claims, 6 Drawing Sheets

STORING AND RETRIEVING MEDIA RECORDINGS IN AN OBJECT STORE

FIELD OF INVENTION

The present disclosure relates to digital data storage technology. In particular, it proposes methods and devices for storing and retrieving media recordings in an object store and for performing maintenance on an object store in which media recordings have been stored.

TECHNICAL BACKGROUND

Alongside classical file systems where files are organized in directory structures (folder trees), non-hierarchical data storage architectures are attracting interest in various industry branches and finding growing use in applications where massive amounts of data are to be stored in networked (cloud) memories. An architecture well suited for large amounts of unstructured data to be stored and accessed over a network connection is object storage, where the data is managed as objects, without a file hierarchy or block hierarchy. If an object store is implemented on a memory drive, the lower protocol layers of the memory drive are abstracted away from the users of the object store (e.g., human users, software applications and connecting client computers).

In video monitoring and similar use cases, the storage is expected to be not just a safe and reliable archive, but there is an additional need for search tools that enable efficient retrieval of stored data items. A useful search tool should combine good precision and recall with acceptable execution times. Many available storage solutions achieve this by indexing or tagging the data in advance of the searches. Indexing and tagging are computationally quite costly preprocessing steps that could add significant amounts of overhead data, and they are often difficult to parallelize.

U.S. Ser. No. 10/210,191B2 discloses a method for accessing data that has been stored using object storage technology. The storing operation includes: creating an object in an object store making use of a file system; obtaining an index node (I-node) identifier (ID) for an I-node associated with the object; creating an object ID for the object, wherein the object ID is unique from any other object IDs in the object store; merging the I-node ID into the object ID to create a merged object ID that includes the I-node ID in its entirety, the I-node ID being extractable from the merged object ID; and modifying the I-node to include at least the merged object ID. The accessing operation includes: extracting an I-node ID in its entirety from an object ID associated with an object stored in an object store making use of a file system; accessing an I-node associated with the I-node ID and determine an object ID stored therein; determining whether the object ID from the I-node matches the object ID associated with the object from which the I-node ID was extracted; and performing an operation on the object. It is suggested in U.S. Ser. No. 10/210,191B2 that the I-node-based access can be more conveniently upscaled than the straightforward option of using the object IDs directly. The present disclosure proposes alternatives to this storage/access setup and similar techniques according to the state of the art.

With a focus rather on cognitive aspects, US20210112154A1 proposes software applications for analyzing a scene viewed by a mobile phone's camera. Image processing tasks, which are applied to the scene and may be assisted by additional information such as voice commands, can be performed locally in the phone, whereas related indexing tasks can be entrusted to networked processing resources. In particular, the aim of the local processing may be to discern pixel groups ("clumps") that potentially depict identifiable visual objects or features in the camera's field of view. Each clump of pixels carries a "symbol", and this "clump ID" may as well be utilized as an "object ID" if the clump can be visually recognized as an object. Further, a recognized visual object can be annotated with a "keyvector" constituting a set of attributes stored in "elemental cloud-based form" in a cloud-based registry, in such manner that "each data object known to the local device is instantiated via data in the cloud". The attributes can include a recording time and a recording source. The pixel data are stored in the phone's own memory.

SUMMARY

The present disclosure makes methods and devices available for storing a media recording in an object store. In such methods and devices, it is desirable if a media recording becomes retrievable as soon as it has been stored, or with only a limited amount of additional processing. Another objective is to make methods and devices available for retrieving a relevant media recording among media recordings which have been stored in an object store. The efficiency and performance of such methods and devices may be improved if the relevant media recording can be located without unnecessary calls to the object store and with a limited amount of traffic to and from the object store. Further, making methods and devices available for performing maintenance on an object store containing stored media recordings would be beneficial. The maintenance should be such as to facilitate later searches for relevant media recordings and/or facilitate clean-up of obsolete media recordings. Achieving this using generic, non-customized technology (e.g., object storage solutions) to the furthest extent possible and leverage such functionalities that are already available in this technology would also be beneficial.

At least some of this is achieved by the disclosure as defined by the independent claims. The dependent claims relate to advantageous embodiments of the disclosure.

In a first aspect of the disclosure, there is provided a method of storing a media recording, which contains media data associated with metadata. The method comprises: assigning a recording identifier, ID, to the media recording; storing the media data in one or more data objects in an object store, wherein each data object carries the recording ID; storing the metadata in an attribute object in the object store, wherein the attribute object carries the recording ID; computing a hash of the metadata; storing the hash, the recording ID, a recording interval and a recording source of the media recording in an index object in the object store; and concatenating the index object with an existing index object.

The concatenation of the index object with an existing index object will tend to reduce the total number of index objects in the object store. In turn, this limits the number of index objects that need to be inspected when an exhaustive search for a media recording is performed. As will be explained in detail below, the inclusion in the index object of a hash of the metadata makes it possible to perform searches by the support of a local cache, which helps reduce traffic to and from the object store. Preferably, the concatenating step is performed at a component separate from the component or components that perform the foregoing steps. For example, the concatenating step may be entrusted to a maintenance component, whereas the foregoing steps may be entrusted to an ingest component in the same or a different location. The proposed separation of responsibilities means that the ingest component can be optimized for convenient, fast storing of new media recordings, while the maintenance component can operate independently. Further, because the maintenance component is not subject to any compelling execution-time constraint, it can be scheduled to execute on a shared processing resource during periods of low computational load.

In a second aspect of the disclosure, there is provided a method of retrieving a media recording, which contains media data associated with metadata, wherein the method is implemented in a search component with access to an object store and with local access to a cache. It is understood that the local access is practically unlimited as to volume and/or so fast that it does not noticeably contribute to the overall execution time. The access to the object store may be more restrained, in the sense that exchanging data with the object stores implies a cost, a delay or some degree of congestion, as is sometimes the case with remote access or networked access.

The method according to this second aspect comprises: receiving a search query; identifying, based on one or more index objects in the object store, a matching media recording which matches the search query, wherein at least one of the index objects refers to a plurality of media recordings and stores, for each media recording, a recording identifier, ID, and a hash of the metadata of the media recording; determining whether the matching media recording's hash agrees with a hash of any metadata (i.e., any metadata item, corresponding to the metadata of one media recording) in the cache. The next step is dependent on the outcome of the determination. In case of agreement, metadata of the matching media recording is obtained from the cache. In case of non-agreement, an attribute object of the matching media recording is retrieved from the object store, and its metadata is obtained from the retrieved attribute object. Regardless of whether the hash was found to agree or not, one or more data objects of the matching media recording are retrieved from the object store.

Because at least some of the index objects refer to a plurality of media recordings each (e.g., as a result of concatenation), the identifying step can be executed by inspecting a limited number of index objects. Unnecessary calls to the object store for the purpose of retrieving attribute objects are conveniently avoided thanks to the fact that the index objects hold hashes of the metadata of the media recordings.

In a third aspect of the disclosure, there is provided a method of performing maintenance on an object store that stores a plurality of media recordings, each media recording containing media data associated with metadata, the object store containing one or more one index objects, wherein each index object refers to at least one media recording and stores, for the media recording, a recording identifier, ID, and a hash of the metadata of the media recording. The method comprises: locating two or more index objects in the object store that refer to media recordings having respective recording intervals that are contained in a common time period; and concatenating the index objects.

The concatenation of the two or more index objects will tend to reduce the total number of index objects in the object store. In turn, this limits the number of index objects that need to be inspected when an exhaustive search for a media recording is performed. It is understood that a "time period" in the sense of the claims is longer than a "recording interval"; while the "recording interval" may represent a suitable granularity for managing a recording (e.g., minutes, hours), the "time period" may correspond to a granularity suitable for managing clean-up of batches of obsolete media recordings (e.g., hours, days, weeks). Accordingly, the condition that the index objects to be concatenated shall belong to a common time period (e.g., same recording date) will ensure that no index objects refer to recordings from two different time periods (e.g., different dates), so that a desired purging of all media recordings from a specific date can be effectuated without complications.

A fourth aspect of the disclosure relates to a system comprising an ingest component and a maintenance component configured to perform the storing method.

A fifth aspect of the disclosure relates to a system comprising a search component configured to perform the retrieving method.

A sixth aspect of the disclosure relates to a system comprising a maintenance component configured to perform the maintenance method.

A seventh aspect of the disclosure relates to a system comprising an ingest component configured to perform the storing method except for the concatenating step.

The disclosure further relates to a computer program containing instructions for causing a computer, or the above-mentioned ingest, maintenance and/or search components in particular, to carry out the above methods or method steps. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

The systems and computer programs according to the disclosure generally share the effects and advantages of the first, second and third aspects outlined above, and they can be implemented with a corresponding degree of technical variation.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
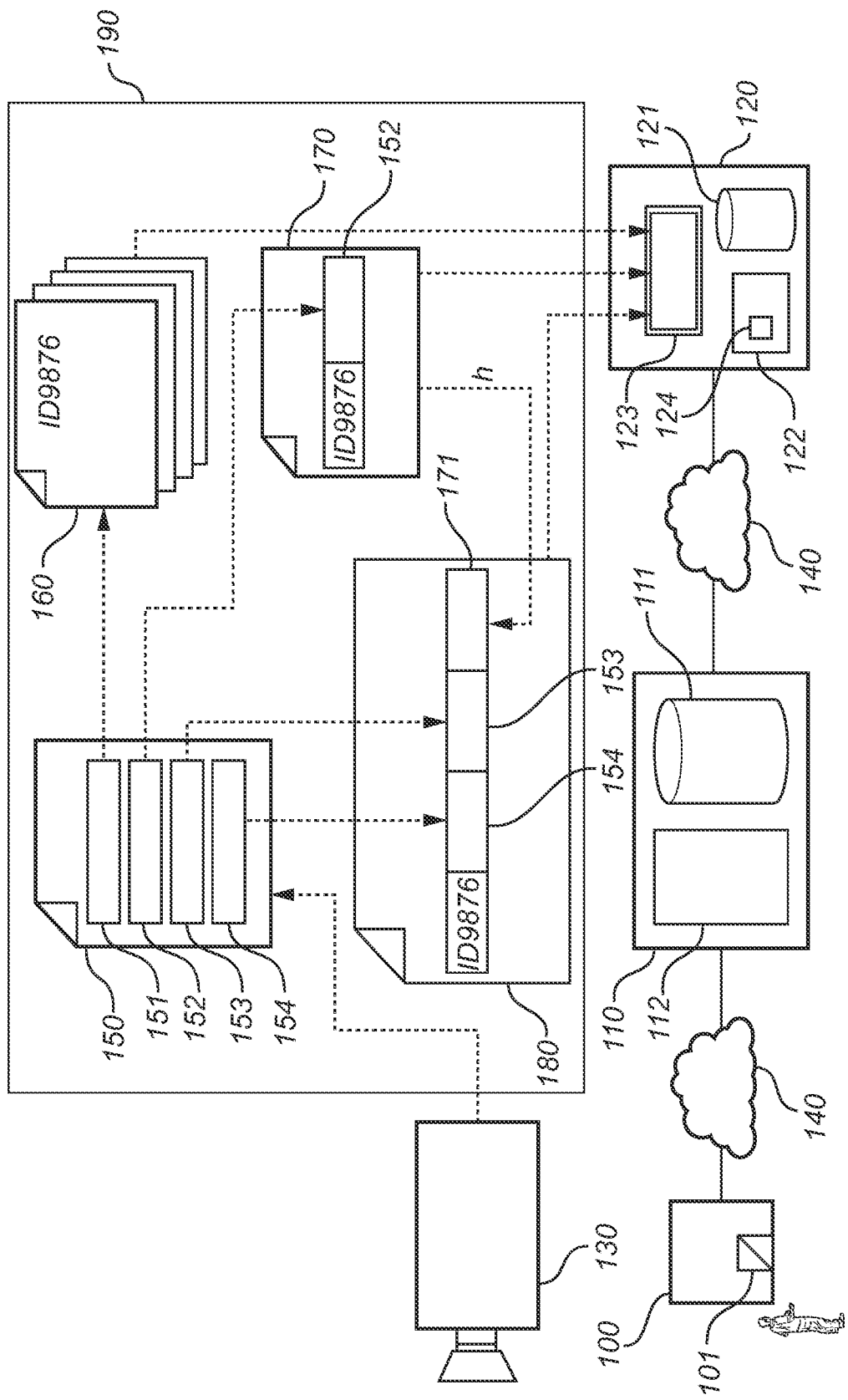
FIG. 1 shows a system with components for storing and retrieving media recordings in an object store and a further component for performing maintenance on the object store, according to embodiments of the present disclosure.

FIG. 1 shows a system with components 100, 110, 120, 130, 190 for storing and retrieving media recordings 150 in an object store 123 and a further component for performing maintenance on the object store 123. A media recording 150 consists of media data 151 and metadata 152, where the metadata 152 includes information of a technical or administrative nature, which is not necessarily rendered to a user during playback of the media recording 150 but may influence quantitatively and qualitatively how the rendering is performed. The metadata 152 may as well be utilized for additional content-related data which the specified coding format of the media data 151 cannot absorb. The media recording 150 may further be annotated with a recording interval 153 and a recording source 154. The recording interval 153 indicates, with reference to a reference clock (e.g., network time, GMT), when the acquisition of the media recording 150 started and ended. The recording interval 153 may for example be expressed as {start, end}, {start, duration} or {duration, end}, where the entries start and end refer to said reference clock. With an understanding that a recording source 154 produces at most one media recording 150 at a given point in time, the combination of a recording interval 153 and a recording source 154 can be used as search query to identify relevant media recordings 150.

In the example shown in FIG. 1, the media recordings 150 are video recordings, in which the media data 151 and metadata 152 include video data associated with video metadata. A video camera 130 suitable for acquiring such video recordings is illustrated in FIG. 1. The video camera 130 may be a digital video camera, a digital monitoring video camera or a digital surveillance camera. The metadata 152 may relate to technical properties of the video recording, such as the resolution, number of frames per second, coding format and the like. The metadata may be relied upon to render (playback) the video recording correctly and efficiently.

An ingest component 190 is configured to store a media recording as data objects 160, attribute objects 170 and index objects 180 in the object store 123. The data objects 160, attribute objects 170 and index objects 180 may in some embodiments be instances of a same object type for which the object store 123 is configured. In other embodiments, data objects 160, attribute objects 170 and index objects 180 correspond to two or more different object types, e.g., differing in terms of their specified payload size or associated operations.

A search component 110 is configured to handle search queries and retrieve relevant media recordings 150 based thereon. For this purpose, the search component 110 comprises processing circuitry 112 and a memory acting as cache 111. The processing circuitry 112 may be localized circuitry or distributed circuitry with one or multiple processor cores. Access to the cache 111 is local in the sense that no perceptible speed, cost or volume constraints apply.

The system further comprises a storage component 120 (or server) which includes memory 121 and processing circuitry 122 and which implements an object store 123. The object store 123 is operable to accept data from the ingest component 190. The object store 123 is further operable to accept and process search requests from the search component 110 and, in response, to transfer search results. The search component 110 can furthermore retrieve objects from the object store 123, i.e., have them transferred to the search component 110 from the storage component 120. When the search component 110 has remote access to the object store 123, as suggested by the intervening communication network 140 in FIG. 1, the number of calls and volume of traffic between these components may incur a cost in terms of a delay, a marginal contribution to network congestion and/or a processing effort. In the present disclosure, an object store 123 is an instance (repository) of storage technology according to an object storage architecture. Optionally, the object store 123 may be compliant with standards such as INCITS 458-2011 (Information technology—SCSI Object-Based Storage Device Commands-2; OSD-2) and INCITS 400-2004 (Information technology—SCSI Object-Based Storage Device Commands; OSD), issued by the International Committee for Information Technology Standards. Amazon Simple Storage Service™ (Amazon S3) and Microsoft Azure Blob Storage™ are example cloud-based object store services.

There is further provided a maintenance component 124 for performing maintenance (including index object concatenation) on the object store 123. The maintenance component 124 may correspond to dedicated hardware (not shown), in or outside the storage component 120, or it may be implemented as software code executing on the processing circuitry 122 of the storage component 120 or on processing circuitry 122 outside the storage component 120. The maintenance component 124 may optionally have further responsibilities relating to the inspection of the data structures currently stored in the object store 123 and relating to the prevention, discovery and correction of faults in these. It is understood that the low-layer aspects of the memory drive(s) on which the object store 123 is implemented may be subject to separate maintenance.

The described components of the system may exchange data, messages and/or instructions among themselves at runtime. The components need not be under common control or ownership; for example, the object store 123 may be hosted by an organization (e.g., cloud services provider) which is different from the organization that provides the media recordings 150 (e.g., security company), which is in turn different from the party that normally searches for and views the media recordings 150 (e.g., security company's customer). Accordingly, there is also no necessity for the components to be located in physical proximity of each other. To illustrate the flexible choice an implementer has between local and distributed deployments, FIG. 1 shows that some pairs of components are connected via a communication network 140 (or multiple communication networks 140), each of which may be a local-area or wide-area network, while other components have direct connections.

In some embodiments, a source of the media recordings 150 (e.g., video camera 130, optionally equipped with post-processing components) is co-located with the storage component 120 and the maintenance component 124. The ingest component 190 can be co-located with—or implemented in—the storage component 120, or the ingest component 190 can be an independent component. The search component 110 (e.g., an API) can be co-located with the storage component 120, or the search component 120 can be an independent component. In some embodiments, the user (e.g., human user, software application, connecting client computer) accesses the search component 110 directly; in other embodiments, as shown in FIG. 1, the user interacts with the search component 110 via a user interface 101 (e.g., a web interface) which executes on a user-side component 100. This is advantageous because, on the one hand, the traffic volume between the storage component 120 and the search component 110 will normally be greater than the traffic volume between the search component 110 and the user-side component 100 and, on the other hand, the search component 110 can be arranged closer to the storage component 120.

Figure 2:
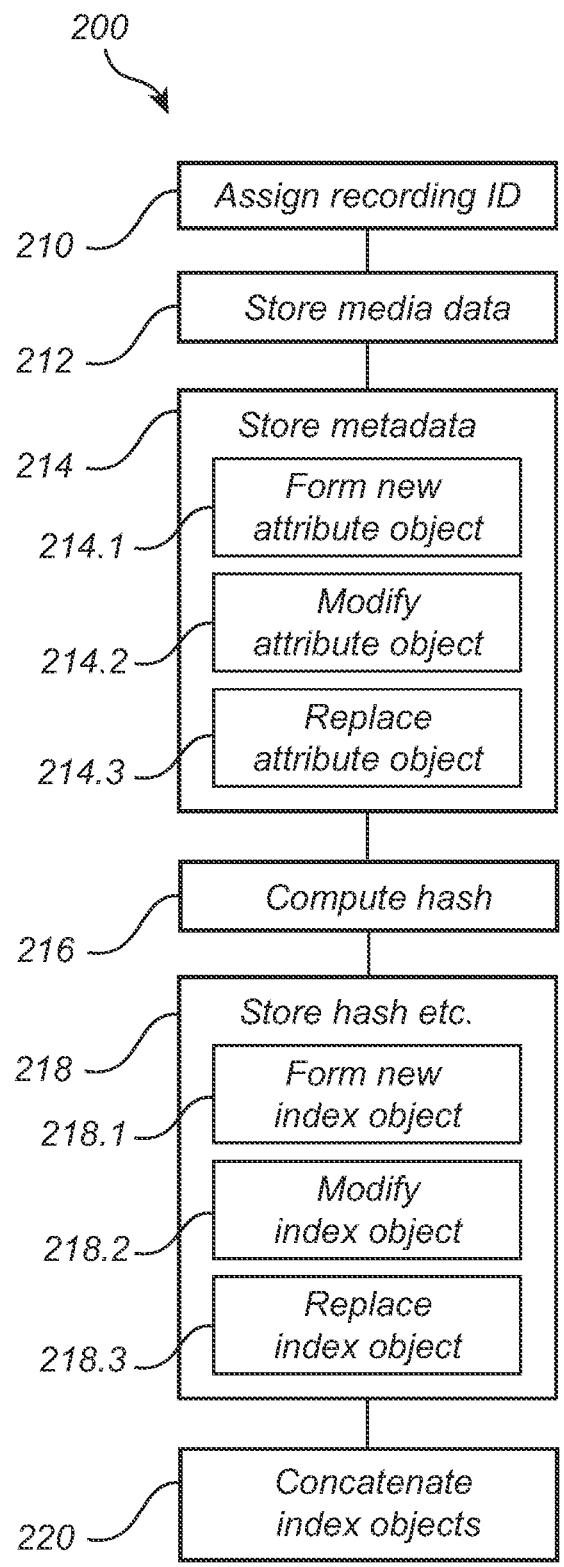
FIGS. 2 through 4 are flowcharts of methods according to embodiments of the disclosure.

FIG. 2 is a flowchart of a method 200 for storing a media recording 150, which will now be described with continuing reference to FIG. 1. The steps of the method 200 can be allocated in different ways. In one embodiment, all steps are performed by the same component. In another embodiment, the assigning 210, storing 212, 214, 218 and computing 216 steps are performed at a first component (e.g., the ingest component 190 in FIG. 1) while the concatenating step 220 is performed at an independent second component (e.g., the maintenance component 124). This other embodiment may speed up the storage operation and/or may lend itself to more economical implementation, where major parts of the processing is deferred to periods of lower total processing load. In yet another embodiment, the initial steps 210, 212, 214, 216, 218 are as shown in FIG. 2 but the concatenating step 220 is replaced with a step of initiating concatenation, and the method 200 is performed in its entirety by the same component. Initiating concatenation may include issuing a command to the maintenance component 124 or leaving the data stored in the object store 124 in a condition that indicates to the maintenance component 124 that concatenation should be performed. The indication may be implicit, e.g., the maintenance component 124 may be configured to look for index objects 180 in the object store 123 that are below a threshold size, or to periodically count the total number of index objects 180 that are below a threshold size. Either way, the creation of a new index object 180 by the ingest component 190 will be noticed by the maintenance component 124 and may thus be understood as an initiation of concatenation. The indication may also be explicit, e.g., the index object carries a flag representing 'has not been concatenated'.

In a first step 210 of the method 200, a recording identifier (ID) is assigned to the media recording 150. As the examples ID9874, ID9875, ID9876 in FIGS. 1, 5A-B and 6A-C suggest, the recording ID may be an arbitrary number or alphanumeric string, such as a sequential number with a suitable length. Preferably, the recording ID is unique to the media recording 150 for as long as it is stored in the object store 124. A recording ID of a deleted obsolete media recording 150 can be re-assigned to a new media recording 150. It is noted the recording ID is independent of any object identifiers that the object store 123 might assign to each stored object.

In a second step 212, the media data 151 of the media recording 150 is stored in one or more data objects 160 in the object store 123, wherein each data object 160 carries the recording ID. The recording ID may be included in an object identifier of the data object 160 or in an object metadata item. Functionally, the recording ID is carried by the data objects 160 in such manner that the object store 123 allows efficient retrieval (e.g., by a dedicated request) of all data object 160 with a specified recording ID. A data object 160 may be used for storing only the media data 151, or it may contain data in addition to the media data 151. In some embodiments, the data objects 160 may be stored in the object store 123 progressively while the media recording 150 is being produced, e.g., at predefined time intervals or when a media data cache exceeds a predefined level. In other embodiments, the method 200 is not executed until the media recording 150 is complete. In this case, the number of data objects 160 to be used may be determined by the maximum allowed size of objects in the object store 123.

In a third step 214 of the method 200, the metadata 152 of the media recording 150 is stored in an attribute object 170. The metadata 152 of one media recording 150 will occasionally be referred to in the present disclosure as a "metadata item". As explained under the second step 212, the attribute object 170 carries the recording ID in such manner that the object store 123 allows efficient retrieval of the attribute object 170 with a specified recording ID. The step 214 may include forming 214.1 a new attribute object 170 and storing the metadata 152 therein. Alternatively, the metadata 152 may be stored in an existing metadata object 152, which is modified (edited) 214.2. Further alternatively, an existing attribute object 170, which contains the metadata of one or more previously stored media recordings, is replaced by a new attribute object 170 which contains the metadata of the previously stored media recording(s) as well as the metadata of the media recording 150 in respect of which the method 200 is being executed. The preferred option, especially if the metadata 152 is not expected to change after step 214, is to store the metadata 152 in a newly formed 214.1 attribute object 170, whereby each attribute object 170 in the object store 123 will contain metadata 152 of a single media recording 150 only.

In a fourth step 216, a hash 171 of the metadata 152 is computed. This includes mapping the metadata 152 by a hash function h. The hash function, or one-way function, shall be predefined (e.g., it shall be reproducible) so that the hashes can be regenerated at the search component 110. The hash function may be a cryptographic or non-cryptographic hash function, such as SHA-256, SHA3-512 and RSA-1024. Because the hash function is not used for safety-related purposes within the method 200, relatively simple hash functions can be adopted as long as the collision probability is acceptably small. A hash collision could lead the search component 110 to rely erroneously on a cached metadata item but will not expose the metadata to unauthorized parties.

In different embodiments, the step 216 may include hashing the metadata 152 in its entirety or hashing a subset thereof which has been extracted according to a predefined deterministic rule. The hash 171 may be based on a combination of the metadata 152 and a cryptographic salt. Regardless of these choices, it is advantageous for the hash 171 of the metadata 152 to be independent of the recording ID, i.e., the recording ID preferably should not form part of the input data to the hash function h. This way, the search component 110 will be able to forgo retrieving the metadata of a later media recording from the object store 123 when the hashes indicate that this metadata coincides with the metadata of an earlier media recording 150.

In a fifth step 218 of the method 200, the hash 171, the recording ID and indications of the recording interval 153 and recording source 154 of the media recording 150 are stored in an index object 180 in the object store 123. After the fifth step 218, the execution of the method 200 will have produced the data object(s) 160, the attribute object 170 and the index object 180 shown in FIG. 1. More precisely, the hash 171, the recording ID and the indications of the recording interval 153 and recording source 154 may be stored:

in a newly formed 218.1 index object 180-2 (see FIG. 6B, where ID9876 is the recording ID of the media recording 150 to be stored), in a modified 218.2 index object 180-1 (see FIG. 5B, which shows the possible result of appending information for the media recording ID9876 to the index object 180-1 shown in FIG. 5A), or in a substitute index object to which the information is appended and which replaces 218.3 an existing, previously stored index object in the object store 123.

For purposes of illustration, it is assumed in this example that the hash 171, the recording ID and the indications of the recording interval 153 and recording source 154 are stored in a newly formed index object 180-2. In this case, the newly formed index object 180-2 may optionally carry the recording ID (i.e., in addition to containing the recording ID). If the index objects 180 carry the recording ID, it will be possible to conveniently list multiple index object by issuing a single list operation to the object store 123. Otherwise, if the index objects 180 do not carry recording IDs, the same number of retrieval operations (e.g., get) as there are the index objects may be needed in order to read the respective recording IDs.

Figure 6A:
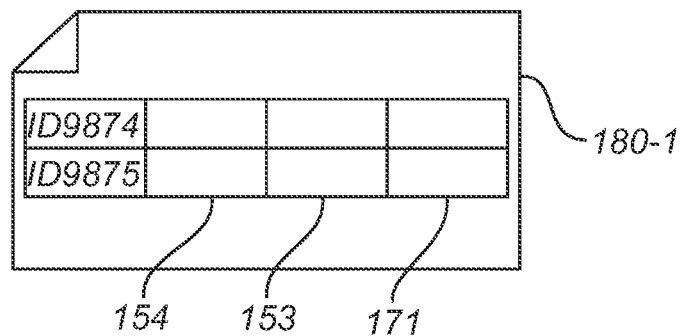
Figure 6B:
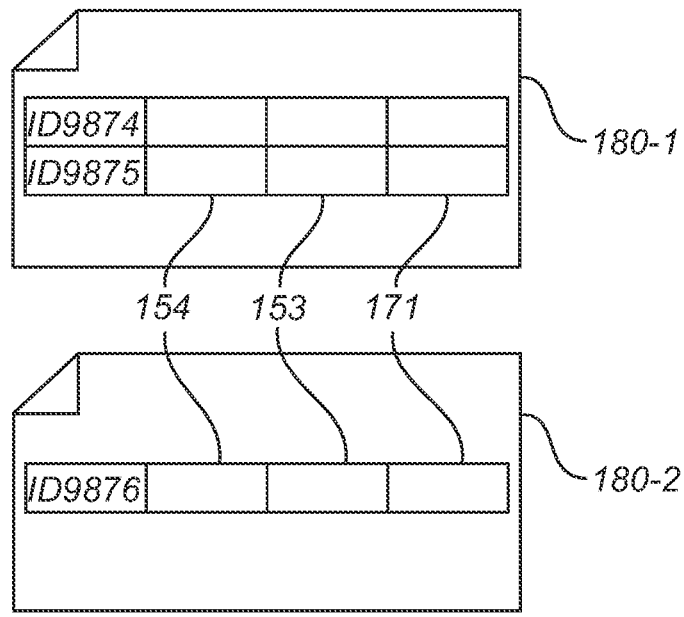
Figure 6C:
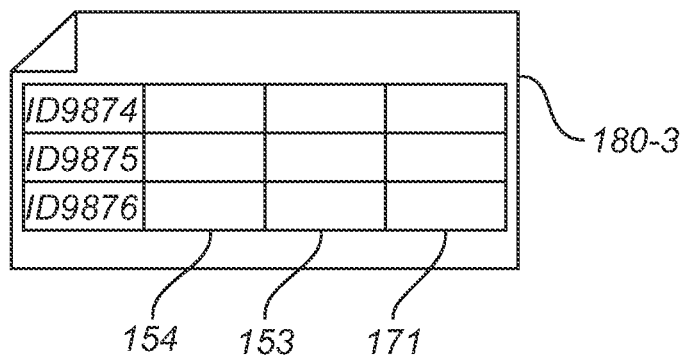

In a sixth step 220 of the method 220, then, the newly formed index object 180-2 is concatenated with an existing index object 180-1. To illustrate, FIGS. 6A, 6B and 6C show a subset of the content of the object store 123 at three consecutive points in time. The content includes an existing index object 180-1, which holds information for media recordings ID9874 and ID 9875; a newly formed index object 180-2, which holds information for the media recording ID9876 that is to be stored by execution of the storing method 200; and an index object 180-3 which results from the concatenation of the existing and newly formed index objects 180-1, 180-2. Because the index object 180-3 resulting from the concatenation contains the information of all three media recordings ID9874, ID9875, ID9876, the search component 110 will be able to exhaustively evaluate a search query by inspecting one index object less. The existing index object 180-1 may have been stored in the object store 123 as a result of storing an earlier media recording 150. In specific embodiments of the method 200, the sixth step 220 is executed at scheduled intervals (e.g., every n minutes, every n hours, at the end of each working day) and/or whenever affordable processing resources are available. The sixth step 220 may be configured such that two index objects are concatenated as soon as they refer to media recordings 150 whose recording intervals 153 are contained in a common time period. This way, after the sixth step 220 has been executed sufficiently many times, a single index object 180 will refer to all media recordings 150 from that time period, which simplifies subsequent searches. It is recalled that a "time period" (e.g., hours, days, weeks) is preferably configured longer than a typical "recording interval" (e.g., minutes, hours). A concatenation of two index objects IO1, IO2 may include:

appending the content of IO1 to IO2 and deleting IO1 from the object store 123, appending the content of IO2 to IO1 and deleting IO2 from the object store 123, or forming a new index object IO3 which holds the combined content of IO1 and IO2 and replaces IO1 and IO2 in the object store 123.

As announced initially and as those skilled in the art may realize after studying the present disclosure, the method 200 can be executed with a different sequence of the steps. For example, step 218 can be executed before step 214, and step 216 can be executed before step 214.

Figure 3:
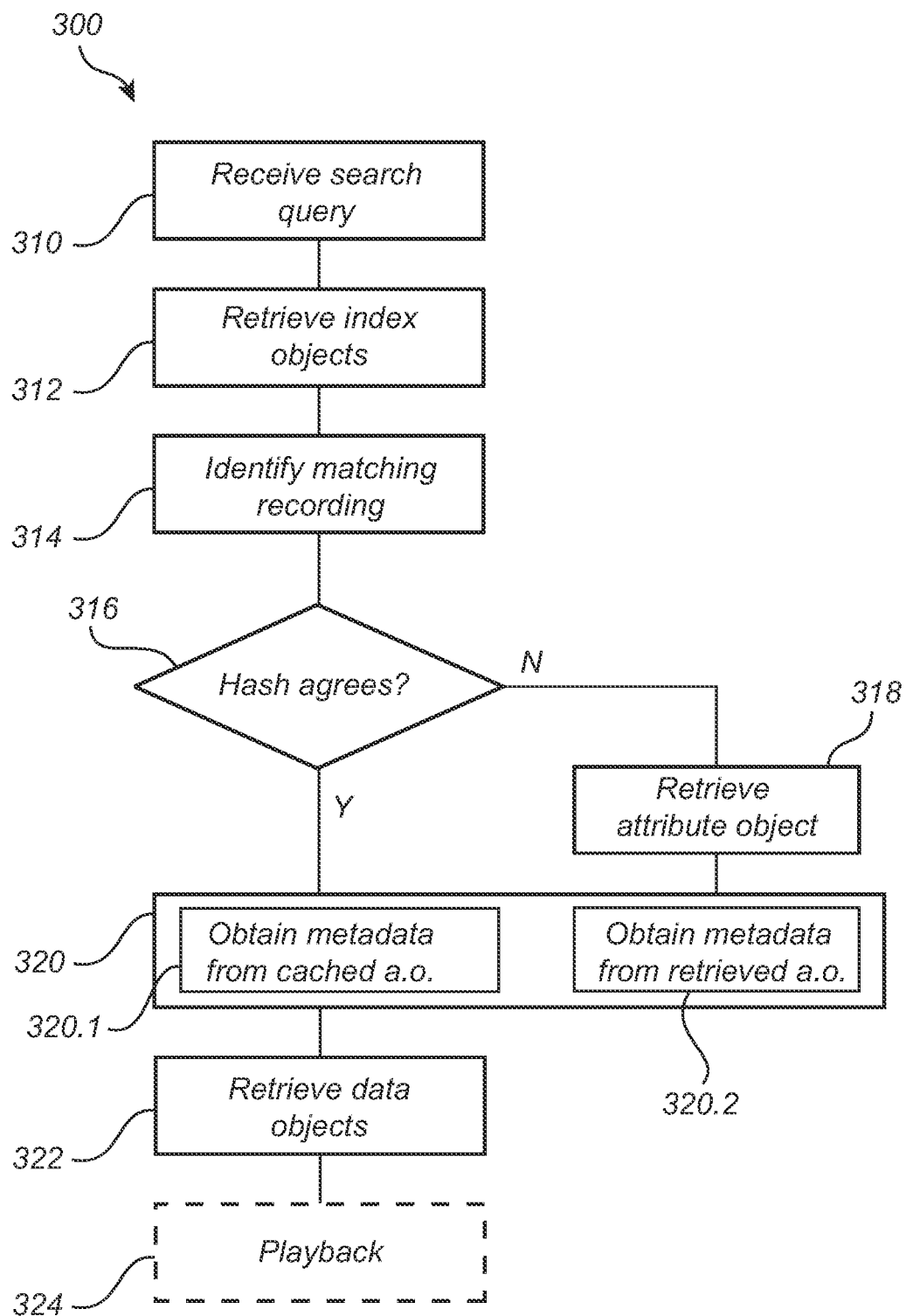

Turning to FIG. 3, there will now be described a method 300 for retrieving a media recording 150. The method 300 is suitable for execution by the search component 110, which has access to an object store 123 and has local access to a cache 111. The method 300 may be executed at such point in time that the cache 111 contains metadata 152 of a number of media recordings 150. The metadata 152 in the cache may be copies of metadata items of attribute objects 170 in the object store 123, e.g., as a by-product of earlier searches or as a result of a dedicated storing of a snapshot of all metadata 152 in the object store 123. In different embodiments, the cache 111 may hold free metadata items or attribute objects 170 containing such metadata items.

In a first step 310 of the method 300, a search query is received. The search component 110 may receive the search query from a user, e.g., a human user, a software application or a connecting client computer. The allowed format of the search query may vary between different embodiments, notably as a result of which search requests the object store 123 supports. For example, the search query may refer to a recording interval, an identifier or other attribute of a recording source, and/or a recording ID. Because the metadata 152 of the media recordings 150 is stored outside the index objects 180 in the object store 123, it may not be possible in this example to process a search query that is formulated in terms of metadata 152.

If the object store 123 is capable of processing a search request to identify all index objects 180 (e.g., by their object IDs) which refer to media recordings 150 acquired by a recording source 154 with attributes specified by the search request and/or acquired in a recording interval 153 overlapping with an interval specified by the search request, then the search query can be evaluated without retrieving the attribute objects 180 in the object store 123 (i.e., without transferring the attribute objects 180 to the search component 110). This means the execution flow proceeds directly to a step 314 of identifying a matching media recording 150, wherein the identification 314 is performed on the basis of the index objects held by the object store 123. In an alternative embodiment adapted for object stores 123 that lack this search ability, the method 300 includes retrieving 312 the index objects 180 (e.g., transferring the index objects 180 to a memory to which the search component 110 has local access), after which the identification 314 of matching media recordings 150 is performed on the basis of retrieved index objects 180. Either way, the matching media recording 150 to be identified in step 314 is such that it matches the search query.

In view of the foregoing discussion of the storing method 200, it may be appreciated that at least one of the index objects 180 refers to a plurality of media recordings 150, which may be a consequence of the concatenation 220. The index object 180 stores, for each media recording 150, a recording ID and a hash 171 of the metadata 152 of the media recording 150. Optionally, the index object 180 further stores, for each media recording 150, indications of a recording interval 153 and a recording source 154.

In a next step 316 of the retrieving method 300, it is determined whether the matching media recording's 150 hash 171 (i.e., hash of the metadata 152 of the matching media recording 150) agrees with a hash 171 of any metadata 152 (of any metadata item) in the cache 111. The hashes 171 of the metadata items in the cache 111 may have been computed when the metadata items were stored into the cache 111, and using a hash function h identical to that used in the storing method 200. If the hashes agree (e.g., their values are identical; Y branch from block 316), then the metadata 152 can be conveniently obtained 320.1 by locally accessing the cached attribute object 170. If the hashes do not agree (N branch from block 316), the corresponding attribute object 170 is retrieved 318 from the object store 123, and the metadata 152 is obtained 320.2 from the retrieved attribute object 170. In systems where the search component 110 has non-local access to the object store 123, such retrieval 318 may incur a cost in terms of a delay, a marginal contribution to network congestion and/or a processing effort.

The metadata 152, by whichever option it is obtained 320, can be shared with the user from whom the search query was received 310. Optionally, the subsequent steps 322, 324 of the method 300 can be conditional in the sense that they are executed only if the user approves this after it has had an opportunity to inspect the metadata 152.

In a next step 322 of the method 300, the data objects 160 of the matching media recording 150 are retrieved from the object store 123. At this point, it is possible to combine the media data 151 and the metadata 152, so that the media recording 150 is restored. This way, the media recording 150 becomes available for various purposes, such as playback 324. The playback 324 may be carried out using a playback application or a playback device (not shown) and in accordance with the metadata 152.

In some embodiments, the retrieving 318 of the attribute object 170 and/or the retrieving 322 of the one or more data objects 160 includes issuing a request to the object store 123 using the recording ID of the matching media recording 150. Such request can be executed at relatively low cost, as the attribute objects 170 and data objects 160 carry the recording ID, as explained above.

In a further development of the method 300, the step 318 of retrieving the attribute object 170 of the matching media recording 150 includes storing the retrieved attribute object 170 in the cache 111. In this manner, the relatively costly retrieval 318 of the attribute object 170 benefits not only the present search but also any potential later searches for which the matching media recording 150 is identical or has identical metadata 152.

It is noted that the metadata hashing 216 is a non-essential step of the storing method 200. In embodiments where the storing method 200 does not include step 216, the following step 218 will include storing only the recording ID, the recording interval 153 and the recording source 154 in the index object 180. Correspondingly, the retrieving method 300 may be adapted such that the determination 316 is omitted and the execution flow goes directly from step 314 to steps 318 and 320.2, i.e., the attribute object 170 is always retrieved from the object store 123.

Figure 4:
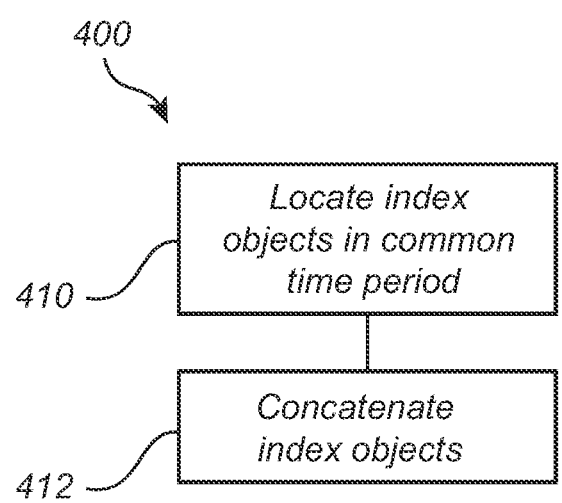
Figure 5A:
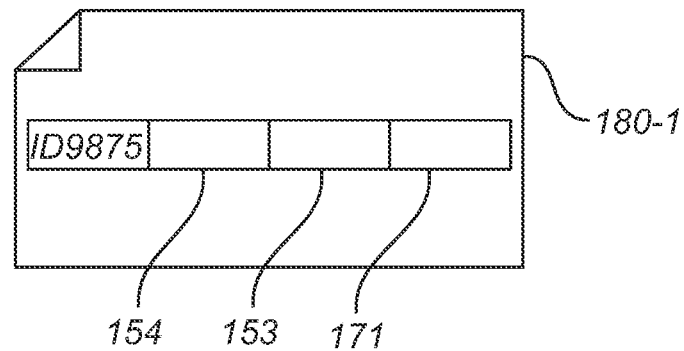
FIGS. 5A-B and 6A-C show example index objects which are used for storing and retrieving media recordings in the object store.
Figure 5B:
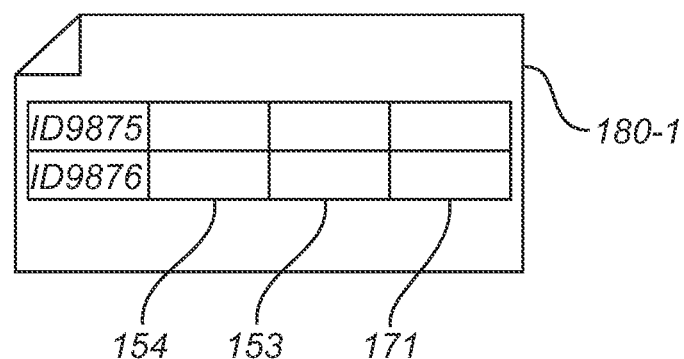

With reference to FIG. 4, there is further provided a method 400 of performing maintenance on an object store 123 for storing a plurality of media recordings 150 of the type described. Accordingly, the maintenance method 400 is suitable for being executed when the object store 123 holds one or more one index objects 180, wherein each index object 180 refers to at least one media recording 150 and stores, for the media recording 150, a recording ID and a hash 171 of the metadata 152 of the media recording 150.

The maintenance method 400 begins with a step 410 of locating two or more index objects 180 that refer to media recordings 150 for which the respective recording intervals 153 are contained in a common time period. It is recalled that a "time period" (e.g., hours, days, weeks) is preferably configured longer than a typical "recording interval" (e.g., minutes, hours).

If such index objects 180 are found in the object store 123, the method 400 will include concatenating the index objects 180 into a smaller number of index objects 180, preferably a single one. FIGS. 6B and 6C illustrate how the content of the object store 123 changes as a result of a concatenation. Reference is made to the above discussion of step 220 of the storing method 200, which may be performed similarly.

As mentioned, the maintenance method 400 may be executed with low priority, e.g., as a background process unless there are specific reasons for accelerating the progress of the concatenation. Embodiments of the method 400 may include performing maintenance on the low-layer aspects of a memory drive on which the object store 123 is implemented or attending to inspection of the data structures currently stored in the object store 123 and the prevention, discovery and correction of faults in these.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of storing a media recording, which contains media data associated with metadata, the method comprising:
at an ingest component:
assigning a recording identifier, ID, to the media recording;
storing the media data in one or more data objects in an object store according to an object storage architecture, wherein each data object carries the recording ID;
storing the metadata in an attribute object in the object store, wherein the attribute object carries the recording ID;
computing a hash of the metadata using a predefined hash function;
storing the hash, the recording ID, a recording interval and a recording source of the media recording in an index object in the object store; and
at a maintenance component:
concatenating the index object with an existing index object.

2. The method of claim 1, wherein the existing index object refers to at least one media recording having a recording interval which is contained in a same time period as the media recording to be stored.

3. The method of claim 1, further comprising forming a new index object, in which the hash, recording ID, recording interval and recording source are stored.

4. The method of claim 1, wherein the hash of the metadata is independent of the recording ID.

5. The method of claim 1, wherein the storing of the metadata includes forming a new attribute object.

6. A method performed in a search component for retrieving a media recording, which contains media data associated with metadata, wherein the method is implemented in a search component with access to an object store according to an object storage architecture and with local access to a cache, wherein the search component comprises processing circuitry and a memory acting as the cache, and wherein the method comprising:
receiving a search query;
identifying, based on one or more index objects in the object store, a matching media recording which matches the search query, wherein at least one of the index objects refers to a plurality of media recordings and stores, for each media recording, a recording identifier, ID, and a hash of the metadata of the media recording;

determining whether the matching media recording's hash agrees with a hash of any metadata in the cache, each of said hashes computed by a predefined hash function;

in case of agreement, obtaining metadata of the matching media recording from the cache;

in case of non-agreement, retrieving an attribute object of the matching media recording from the object store, and obtaining its metadata from the retrieved attribute object; and retrieving one or more data objects of the matching media recording from the object store.

7. The method of claim 6, further comprising storing the retrieved attribute object in the cache.

8. The method of claim 6, wherein:
the index objects further contain, for each media recording, a recording interval and a recording source; and
the search query specifies a recording time and/or a recording source.

9. The method of claim 6, wherein said at least one index objects which refers to a plurality of media recordings has been formed by concatenation of one or more index objects.

10. The method of claim 6, further comprising retrieving said one or more index objects from the object store.

11. The method of claim 6, wherein the media recording is a video recording containing video data associated with video metadata.

12. A method performed in a maintenance component for performing maintenance on an object store according to an object storage architecture for storing a plurality of media recordings, each media recording containing media data associated with metadata, the object store containing one or more one index objects, wherein each index object refers to at least one media recording and stores, for the media recording, a recording identifier, ID, and a hash of the metadata of the media recording, said hash computed by a predefined hash function, wherein the maintenance component comprises processing circuitry, and wherein the method comprising:

locating two or more index objects in the object store that refer to media recordings having
respective recording intervals that are contained in a common time period; and
concatenating the index objects.

13. The method of claim 8, wherein the media recording is a video recording containing video data associated with video metadata.

14. A system configured to store a media recording, the system comprising:
one or more processors and one or more non-transitory computer-readable storage media, the non-transitory computer-readable storage media having stored thereon at least:
an ingest component and a maintenance component configured to perform a method of storing a media recording, which contains media data associated with metadata, the method comprising:
at the ingest component:
assigning a recording identifier, ID, to the media recording;
storing the media data in one or more data objects in an object store according to an object storage architecture, wherein each data object carries the recording ID;
storing the metadata in an attribute object in the object store, wherein the attribute object carries the recording ID;
computing a hash of the metadata using a predefined hash function;
storing the hash, the recording ID, a recording interval and a recording source of the media recording in an index object in the object store; and
at the maintenance component:
concatenating the index object with an existing index object.

\* \* \* \* \*